United States Patent
Iyer et al.

(10) Patent No.: US 11,099,706 B1
(45) Date of Patent: Aug. 24, 2021

(54) ENHANCED USER INTERFACE USING TOUCH GESTURES

(71) Applicant: Dell Products L.P., Round Rock, TX (US)

(72) Inventors: Hari J. Iyer, Round Rock, TX (US); Fernando L. Guerrero, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/916,403

(22) Filed: Jun. 30, 2020

(51) Int. Cl.
*G06F 3/0481* (2013.01)

(52) U.S. Cl.
CPC .................. *G06F 3/0481* (2013.01)

(58) Field of Classification Search
CPC .... G06F 1/1616; G06F 1/1618; G06F 1/1622; G06F 1/1624; G06F 1/1628; G06F 1/1654; G06F 1/1677; G06F 3/0481
See application file for complete search history.

(56) References Cited

U.S. PATENT DOCUMENTS

| | | | |
|---|---|---|---|
| 8,519,965 | B2 | 8/2013 | Cady et al. |
| 9,122,356 | B2 | 9/2015 | Ozias et al. |
| 9,542,097 | B2 | 1/2017 | Ganey et al. |
| 10,459,237 | B2 | 10/2019 | Seibert et al. |
| 10,860,065 | B2 | 12/2020 | Seibert |
| 2015/0046884 | A1* | 2/2015 | Moore ................ G06F 3/0346 715/863 |
| 2015/0130764 | A1 | 5/2015 | Woolley et al. |
| 2016/0162148 | A1* | 6/2016 | Murphy ............. G06F 3/04842 715/863 |
| 2018/0210515 | A1* | 7/2018 | Lyles .................... G06F 1/1618 |
| 2018/0329508 | A1* | 11/2018 | Klein .................... G06F 1/1615 |
| 2020/0159293 | A1 | 5/2020 | Seibert et al. |
| 2020/0365110 | A1 | 11/2020 | Iyer et al. |
| 2020/0372875 | A1 | 11/2020 | Iyer et al. |

OTHER PUBLICATIONS

Hector Cuevas et al., Integrating gesture-based identification in context-aware applications: a system approach, Oct. 1, 2014, IEEE Xplore, pp. 257-264 (Year: 2014).*

Shichang Feng et al., Many-to-One Gesture-to Command Flexible Mapping Approach for Smart Teaching Interface Interaction, Jan. 1, 2019, IEEE Access, vol. 7, pp. 179517-179531 (Year: 2019).*

(Continued)

*Primary Examiner* — Tam T Tran

(74) *Attorney, Agent, or Firm* — Zagorin Cave LLP; Robert W. Holland

(57) ABSTRACT

An information handling system enhanced user interface distinguishes native operating system touch inputs from enhance touch gestures based upon context, such as the number and types of displays interfaced with the information handling system. Enhanced touch gestures include multi-finger touches with symmetrical movement that command start events, move events and end events to interact with content at plural displays through touches at one of the plural displays, such as moving windows, selecting an active window, minimizing windows, maximizing content of one window and restoring minimized content.

20 Claims, 6 Drawing Sheets

(56) References Cited

OTHER PUBLICATIONS

Guo Li et al., Intelligently Creating Contextual Tutorials for GUI Applications, Aug. 1, 2015, IEEE Computer Society, pp. 187-196 (Year: 2015).*
Sareh Saeedi et al., Making the most of context-awareness in brain-computer interfaces, Jun. 1, 2013, IEEEXplore, pp. 68-73 (Year: 2013).*
Apple, "Use the Touch Baron Mac," downloaded from https://support.apple.com/guide/mac-help/touch-bar-mchlbfd5b039/mac on Jun. 10, 2021, 4 pages.
Apple, "Use Multi-Touch Gestures on Your Mac," downloaded from https://support.apple.com/en-US/HT204895 on Jun. 10, 2021, 4 pages.
Apple, "Access Control Center on Your iPhone and iPod Touch," downloaded from https://support.apple.com/en-US/HT202769 on Jun. 10, 2021.
Google, "Change Settings Quickly on Your Android Phone," downloaded from https://support.google.com/android/answer/9083864?hl=en-GB on Jun. 10, 2021, 2 pages.
Microsoft, "Touchpad Gestures for Windows 10," downloaded from https://support.microsoft.com/en-us/windows/touchpad-gestures-for-windows-10-a9d28305-4818-a5df-4e2b-e5590f850741 on Jun. 10, 2021, 3 pages.

* cited by examiner

ENHANCED USER INTERFACE USING TOUCH GESTURES

BACKGROUND OF THE INVENTION

Field of the Invention

The present invention relates in general to the field of portable information handling systems, and more particularly to an information handling system enhanced user interface using touch gestures.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility. In addition to providing mobile use, portable information handling systems also can provide a powerful desktop environment by interfacing with peripheral devices, such as a peripheral display, keyboard and mouse.

One powerful aspect of portable information handling systems is that an integrated touchscreen display offers an intuitive input interface. Generally, an operating system, such as WINDOWS, accepts native touch inputs as values applied to itself and applications based upon an interaction between visual images and touch locations. For instance, native touch inputs are a replacement for mouse cursor clicks to input at a user interface. Similarly, a touch and slide on content presented at a display provides a scroll function of a mouse. Advantageously, touch inputs offer a convenient input mechanism when mobile and no mouse is available. Recently, some portable information handling systems have come to market with a dual display configuration having a second touchscreen display integrated as a replacement for a physical keyboard. Such dual display systems often accept typed inputs by presenting a virtual keyboard at one display that accepts touches at keys as keyed values. In addition, a virtual touchpad may be presented to provide cursor control at the other display similar to a conventional touchpad. When not used as an input surface, the second touchscreen display enhances end user information consumption by offering a larger display area to present content. For example, a dual display device may be used like a book with a page of content on each display, like a tablet where both displays present content of one application, and for presentations in a tent mode where users on opposite sides of the system each see their own content.

One difficulty with touchscreen display end user interactions is that an end user in a desktop environment cannot readily extend native touch interactions to peripheral display devices. For example, while using both integrated displays of a dual screen portable information handling system to present content, touch inputs across both screens can confuse end users. Similar confusion can arise with single screen inputs, especially where a mouse and keyboard are not available, and in set ups that interface touchscreen devices with peripheral displays that lack touch input ability. In some situations, end users coordinate multiple devices through cable and/or wireless interfaces where native touch inputs do not extend between devices so that the end user has to change make inputs for content across different devices, such as when using a laptop with an all-in-one tabletop information handling system. Thus, in order to use a peripheral display, end users shift between touch inputs at the integrated touchscreen devices and mouse inputs at any peripheral devices. In addition, display resolutions have become quite good as ultra high definition displays grow more common so that precise touch inputs can become difficult. Operating system native touch inputs are difficult to extend to an increasing variety of dual display and peripheral device combinations. For example, Surface/Meeting Hub, Kiosks and other similar devices use single touchscreen displays that segment display areas into multiple regions, zones and/or segments where native touch inputs do not translate well across plural information handling system inputs. As a result, the end user experience can become confused, especially where a context at an information handling system changes as applications open, close, and shift between active and non-active states in windows at both integrated and peripheral display devices.

SUMMARY OF THE INVENTION

Therefore, a need has arisen for a system and method which enhances information handling system user interfaces with touch gestures.

In accordance with the present invention, a system and method are provided which substantially reduce the disadvantages and problems associated with previous methods and systems for managing touch inputs at an information handling system touchscreen display. A user interface manager interfaces with a touch detector and distinguishes between native touch inputs managed by an operating system and touch gestures defined to command responses based upon a context determined at the information handling system, such as the number and type of displays and/or segments of a single display that present visual images and applications executing on the information handling system.

More specifically, an information handling system integrates one or more touchscreen displays that accepts inputs as touches. An operating system executing on a central processing unit (CPU) manages native touch inputs by applying the native touch inputs detected by a touch detector to applications executing on the CPU. A user interface manager interfaced with the touch detector defines touch gestures based upon context at the information handling system. At detection by the touch detector of a touch gesture, the touch detector is reported to the user interface manager to manage the input. The touch detector reports a start, move and end event for each touch gesture. Based upon the context at the information handling system, the user interface manager applies the touch gesture as an input.

The present invention provides a number of important technical advantages. One example of an important technical advantage is that a user interface manager provides a flexible tool that adapts touch gestures as inputs based upon a context at an information handling system. Window presentation of content across plural displays, and/or plural display regions at single displays, are manipulated from any touchscreen display across plural displays interfaced with an information handling system. Direct manipulation across all displays, including displays that do not include touch detection, is provided with touches at one display without a need for a keyboard or mouse. Touch gesture solutions enhance end user interactions with functionality for specific applications that enhances end user touch interactions based upon a context of use.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system manages touch inputs at a touchscreen display as native touch inputs and touch gestures with a user interface manager. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
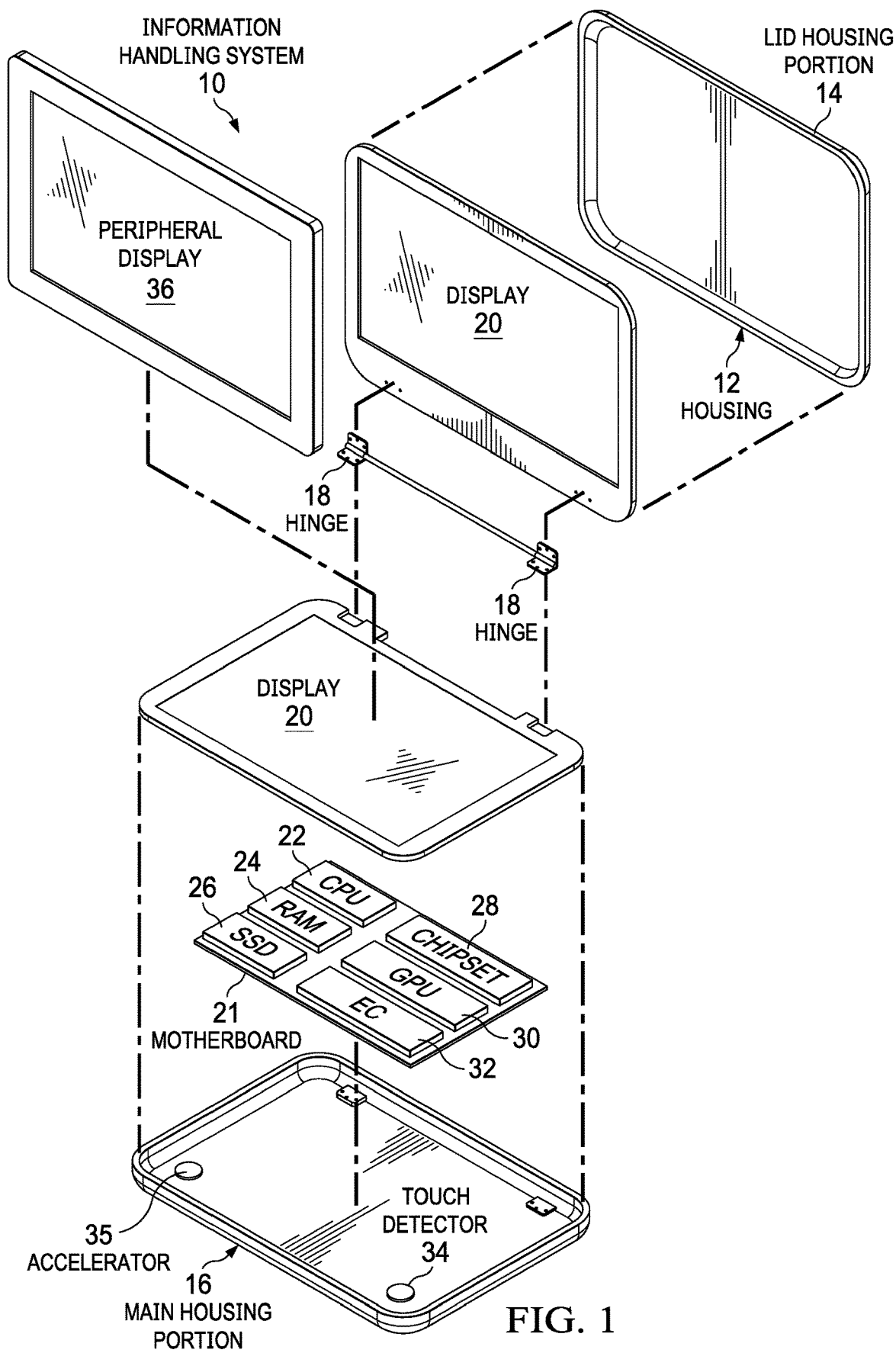
FIG. 1 depicts a perspective view of an information handling system having plural integrated touchscreen displays and interfaced with a peripheral display.

Referring now to FIG. 1, a perspective view depicts an information handling system 10 having plural integrated touchscreen displays 20 and interfaced with a peripheral display 36. In the example embodiment, information handling system 10 is built into a housing 12 having a lid housing portion 14 rotationally coupled to a main housing portion 16 by a hinge 18. Main housing portion 16 contains processing components that cooperate to process information. For example, a motherboard 21 couples to main housing portion 16 and interfaces components that process information. A central processing unit (CPU) 22 executes instructions that process information in cooperation with random access memory (RAM) 24 that stores the instructions and information. A solid state drive (SSD) 26 or other persistent storage device provides non-transitory storage of the instructions and information during powered down states. For example, SSD 26 stores an operating system and applications that are retrieved at power up to generate visual information for presentation at information handling system 10. A chipset 28 manages CPU 22 operations, such as memory and graphics access. A graphics processor unit (GPU) 30 interfaces with CPU 22 and processes information to define visual images for presentation on displays 20 and 36, such as by generating pixel values to create the images at pixels of the displays. Integrated touchscreens 20 include capacitive touch sensors interfaced with a touch detector 34 that determines positions of end user touches at touchscreen displays 20. An embedded controller 32 reports inputs, such as touches as well as keyboard and mouse inputs, to CPU 22 for application by an operating system executing on CPU 22. In addition, an accelerometer 35 interfaces with embedded controller 32 to detect accelerations of housing 12, such as to determine a housing orientation.

Touches at touchscreen displays 20 reported by touch detector 34 are applied by an operating system executing on CPU 22 as predetermined native touch inputs. For example, the operating system applies touches as native inputs in a similar manner to a mouse click at a location of a mouse cursor. Another example of a native touch input is a touch and drag with a finger as a scroll input for content located at the touch. Some native touch inputs use multiple fingers that move relative to each other, such as a pinch together and apart to zoom closer and farther on content.

In the example embodiment, native touch inputs tend to limit end user interactions, especially where the content of interest is on a display having a vertical orientation or a peripheral display. To improve touch input flexibility, the present invention executes a user interface manager distributed over touch detector 34 and CPU 22, such as with an application executing over the operating system, to identify touch gestures based upon system context and apply the touch gestures in preference over native touch inputs. The user interface manager may apply detected touch inputs in various scenarios including single touch displays, single but large touch displays, large workspace hubs where the display can be split into multiple work areas, and multiple touch displays, such as is described in greater detail below with respect to FIG. 6. The user interface manager provides fluent application window manipulations to improve end user touch experiences regardless of the number and types of displays that present visual images from information handling system 10.

The user interface manager includes a detection and translation of touch events and enhanced user interface management of the detected touch gestures. For example, a user interface manager application hook interfaces with touch detector 34 to obtain touch points detected on the touchscreen displays. The user interface manager determines relevant touch gestures for enhanced management from a context of information handling system 10. The context may include a variety of factors, such as: the number of physical displays; a number of logical/virtual display work areas that may be defined for large workspaces; a size of the physical and virtual display work areas; a resolution of the displays; orientations of the displays; a relative position of the displays to each other; a posture of the information handling system and displays (e.g., tablet, clamshell, tent modes); and the number of internal displays versus peripheral displays. Once the context is determined, touch points for touch gestures that are identified are applied as touch start, move and end events for enhanced user interface management. For instance, based upon active applications, windows of content presented, active content in focus, and the context, a touch gesture is applied for an associated task, such as in the examples described below. A given touch gesture can perform different actions based upon the context, such as the display content, location of the touch gesture, active window and open applications.

Figure 2:
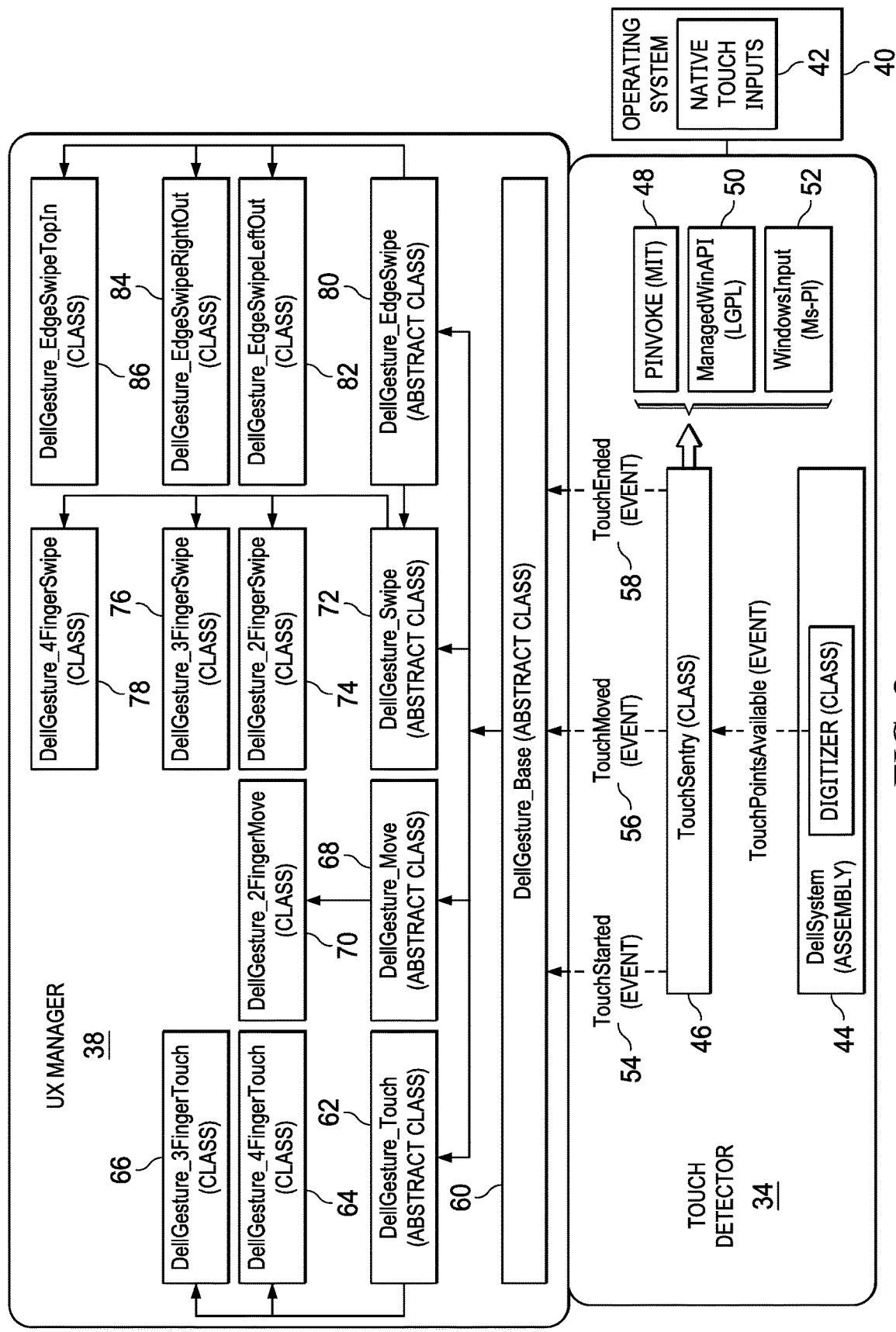
FIG. 2 depicts a block diagram of an enhanced user interface manager for managing touch inputs as native touches and touch gestures.

Referring now to FIG. 2, a block diagram depicts an enhanced user interface manager 38 for managing touch inputs as native touches and touch gestures. In the example embodiment, touch detector 34 interfaces with operating system 40, which manages native touches based upon defined native touch inputs 42. An embedded code stack, such as an operating system driver, communicates with operating system 40 with Pinvoke (MIT) 48, ManagedWin API (LGPL) 50 and WindowsInput (Ms-PL) 52 instances. A digitizer 44 receives signals from the touch sensors embedded in the touchscreen display, determines the touch positions, and reports the touch positions to a touch sentry 46, such as an embedded code instance executing on a controller in touch detector 34. Touch sentry 46 is, for instance, a driver distributed from user interface manager 38 that separates native touch inputs to report to operating system 40 and touch gestures that are instead diverted to user interface manager 38 as a touch started event 54, a touch moved event 56 and a touch ended event 58. Touch sentry 46 may periodically interact with user interface manager 38 to update relevant touch gestures as context at information handling system 10 changes.

Touch gestures reported by touch detector 34 to user interface manager 38 are managed based upon the type of touch gesture that is reported to a gesture base 60. In the example embodiment, gesture base 60 analyzes touch gestures to detect movement of the touch gesture between the start and end event and assigns each touch gesture for management based upon the analysis. For instance, a touch gesture tap without movement is reported to a gesture touch instance 62, a touch gesture movement is reported to a gesture move instance 68, a touch gesture with movement that implies a swipe is reported to a gesture swipe instance 72, and a touch gesture with an edge swipe movement is reported to a gesture edge instance 80. As each touch gesture is identified by type, it is forwarded to logic of user interface manager 38 for application to content presented at the displays based upon context. Described below are some examples of specific touch gestures that may be used and how the touch gestures are applied in different contexts.

Gesture touch instance 62 receives reports of taps of multiple fingers that do not move between the start and end event. In the example embodiment, four finger taps are reported to a 4finger touch instance 64 and three finger taps are reported to a 3finger touch instance 66. The finger taps are defined as fingers located within a predetermined distance of each other, such as may result with the fingers in close proximity to each other to form a symmetrical touch pattern. In one example context, a four finger tap commands a "super maximum" display state that maximizes or restores active content across plural displays, such as both displays of a dual display portable information handling system. Similarly, a four finger tap commands a restoration of the content to the previous display state found before the four finger tap so that a first four finger tap provides super maximum presentation and a second four finger tap restores the previous presentation. The super maximize touch gesture may, depending on context, also expand content to peripheral displays interfaced with the information handling system. As an example, a book reading application that presents book content on a single display may respond to a fourfinger tap by expanding content to place a page on each display that is available. After the book content is presented at all displays, a four finger tap restores the reading application to its previous state to allow an end user quick and easy access to underlying applications, such as email or a web browser.

Gesture move instance 68 reports to gesture 2finger instance 70 two finger touch gesture inputs that move adjacent fingers in a symmetric manner at the touch sensor, such as by reporting the touch gesture movement from the start event until an end event related to a lifting of the two finger gesture off of the touch sensor. As an example, a two finger touch and move event is associated with movement of virtual input devices presented at a display, such as a keyboard or touchpad. The two finger touch may correspond to the position of the virtual device, such as placed within the perimeter of the virtual device, or may be made at any location of any touchscreen display interfaced with the information handling system. Advantageously, the two fingers placed in proximity to each other are identified by touch sentry 46 so that an inadvertent touch input to the virtual device is not forwarded to operating system 40. Gesture 2finger instance 70 moves the virtual device corresponding to symmetrical movement of the two fingers at the touchscreen display by unlocking the position of the virtual device at the start event and relocking the position of the virtual device at the end event. In one example embodiment, the positioning of the two fingers or the use of two and three fingers may be used to distinguish which virtual device is moved. For instance, no spacing between the two fingers may be associated with movement of a virtual touchpad while a slight spacing may be associated with movement of a virtual keyboard. By associating virtual device movement with a two finger touch gesture, virtual device placement may be accomplished by the end user with touches made outside of the perimeter of the virtual device.

Gesture base instance 60 reports gestures that swipe, such as that have a minimum predetermined movement rate, to gesture swipe instance 72 along with the number of fingers. When a two finger swipe is detected, gesture swipe instance 72 reports the direction of the swipe to gesture 2fingerSwipe instance 74. A two finger flick from side to side commands a snap of an active window presented at the displays, such as the window in focus by operating system 40. A two finger swipe in a down direction commands minimization of the active window. In an alternative embodiment, the snap or minimization may be performed to a window on which the two finger touch gesture starts or the active window if performed at a location that does not have a window. Gesture swipe instance 72 reports three finger swipes to gesture 3fingerSwipe instance 76 along with the direction of the swipe. In one example embodiment, a three finger swipe is applied by flicking an active window between content screens. In one example embodiment, the content screen of an inactive window may be changed if the swipe starts at the inactive window while the content screen of the active window is changed if the swipe starts outside of other windows. Advantageously, associating a touch gesture with an active window where the gesture starts outside of the active window allows a touchscreen at a base portion of the information handling system to control presentation of content in a lid portion of the information handling system. When a four finger swipe is detected, gesture swipe instance 72 reports the four finger swipe along with the swipe direction to gesture 4fingerSwipe instance 78. As an example, a four finger swipe in a down direction commands all windows presented at all displays to minimize so that the end user can quickly view the desktop. A four finger swipe in an up direction commands all windows to restore to the previous display configuration. A four finger swipe in a side direction commands a cycling between virtual desktops presented at the displays for selection of an active window. For instance, a right swipe moves in a first sequential order to make each of plural windows active in turn while a left swipe moves in an opposite order. Advantageously, the selection of the active window may be performed at a base touchscreen display to sequentially select the active window amongst the base display, a lid display and plural peripheral displays. When a one finger swipe is detected at a display edge, gesture base instance 60 reports the swipe to gesture edge swipe instance 80 for management based upon the direction of the swipe. For example, a one finger swipe from a top edge of a display is provided to a gesture edge swipe top instance 86 to command presentation of a quick action bar, such as an application drawer with user configurable shortcuts. A one finger swipe from a right edge is provided to gesture swipe right out instance 84 to command a toggle between selected windows to an active state while a one finger swipe from a left edge is provided to gesture swipe left out instance 82 to toggle the active window in an opposite sequence. In various embodiments, the swipe movements may be combined with keyboard inputs to further identify desired active windows.

Advantageously, user interface manager 38 provides an application solution that ties into a touch detection device for rapid and flexible configuration of touch gestures that adjust to information handling system context. If an end user launches an application, such as a presentation application like PowerPoint, with multiple displays presenting visual information, the user interface manager allows rapid adjustment of the presentation of visual information at the plural displays, such as for editing by interaction with other applications presented in other windows and presentation while also controlling the presented visual images by a control panel at one display. The user interface manager can automatically expand the desktop and auto orient the presentation content and control window while increasing the size of a presentation pointer for annotating content. In the context of a presentation application, a one finger swipe may quickly open a palette of options for editing content and enhancing presentation, plus enabling a collaboration between the plural displays. As context changes, such as by opening and closing different applications or interfacing different display devices, touch gestures may be applied in an adjusted manner so that the same touch gesture may command different responses based upon applications executing on the information handling system and the number and type of displays interfaced with the information handling system. For example, with a presentation application executing in presentation mode, a two finger edge swipe might advance the presentation while a one finger edge swipe opens pointing tools. If then a multimedia presentation application is opened, the one finger edge swipe may skip to a next track while a two finger edge swipe increments volume up. Further, an end user may configure specific touch gestures as desired for defined applications and contexts.

Figure 3:
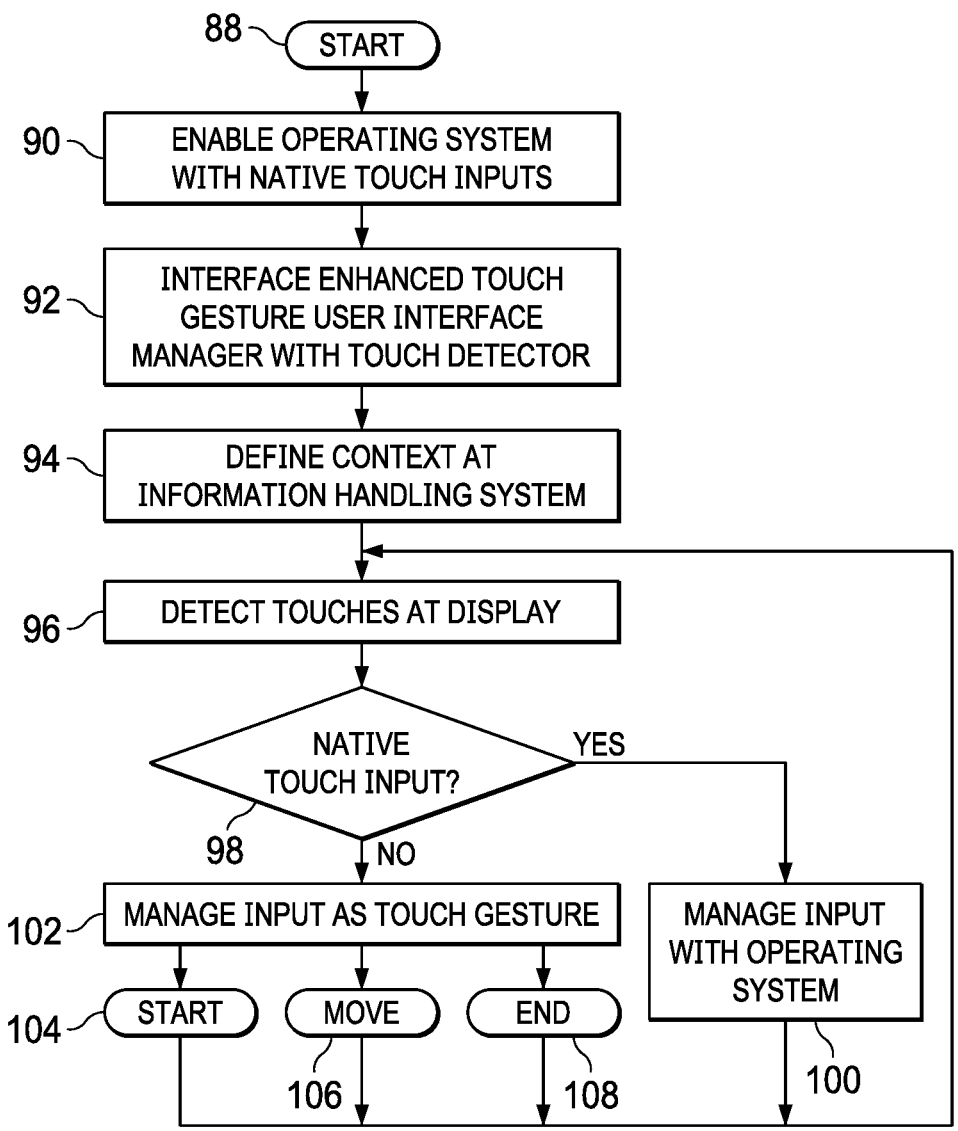
FIG. 3 depicts a flow diagram of process for managing touch inputs as native inputs or touch gestures based upon context.

Referring now to FIG. 3, a flow diagram depicts a process for managing touch inputs as native inputs or touch gestures based upon context. The process starts at step 88, such as with power up of the information handling system and initiation of the user interface manager from non-transient memory. At step 90, the operating system initiates to support native touch inputs. At step 92, enhanced touch gestures are interfaced with the touch detector by the user interface manager to support detection and application of touch gestures in preference over native touch inputs. At step 94, the context of the information handling system is defined, such as based upon the number and type of displays that are interfaced with the information handling system and the applications that are executing on the information handling system. Once the enhanced touch gestures are enabled and configured, the process continues to step 96 to detect touches at the touchscreen displays. At step 98 a determination is made of whether a touch at the touchscreen display is a native touch input or a touch gesture input. If the touch is a native touch input, the process continues to step 100 where the operating system manages the touch input application and then returns to step 96 to continue monitoring for additional touch inputs. If the touch is a touch gesture input, the process continues to step 102 to manage the input as a touch gesture. At step 102, the touch gesture is reported to the user interface manager based on whether the touch resolves as a start touch at step 104, a move touch at step 106 or an end touch at step 108. The process then returns to step 96 to continue monitoring touches at the display.

Figure 4:
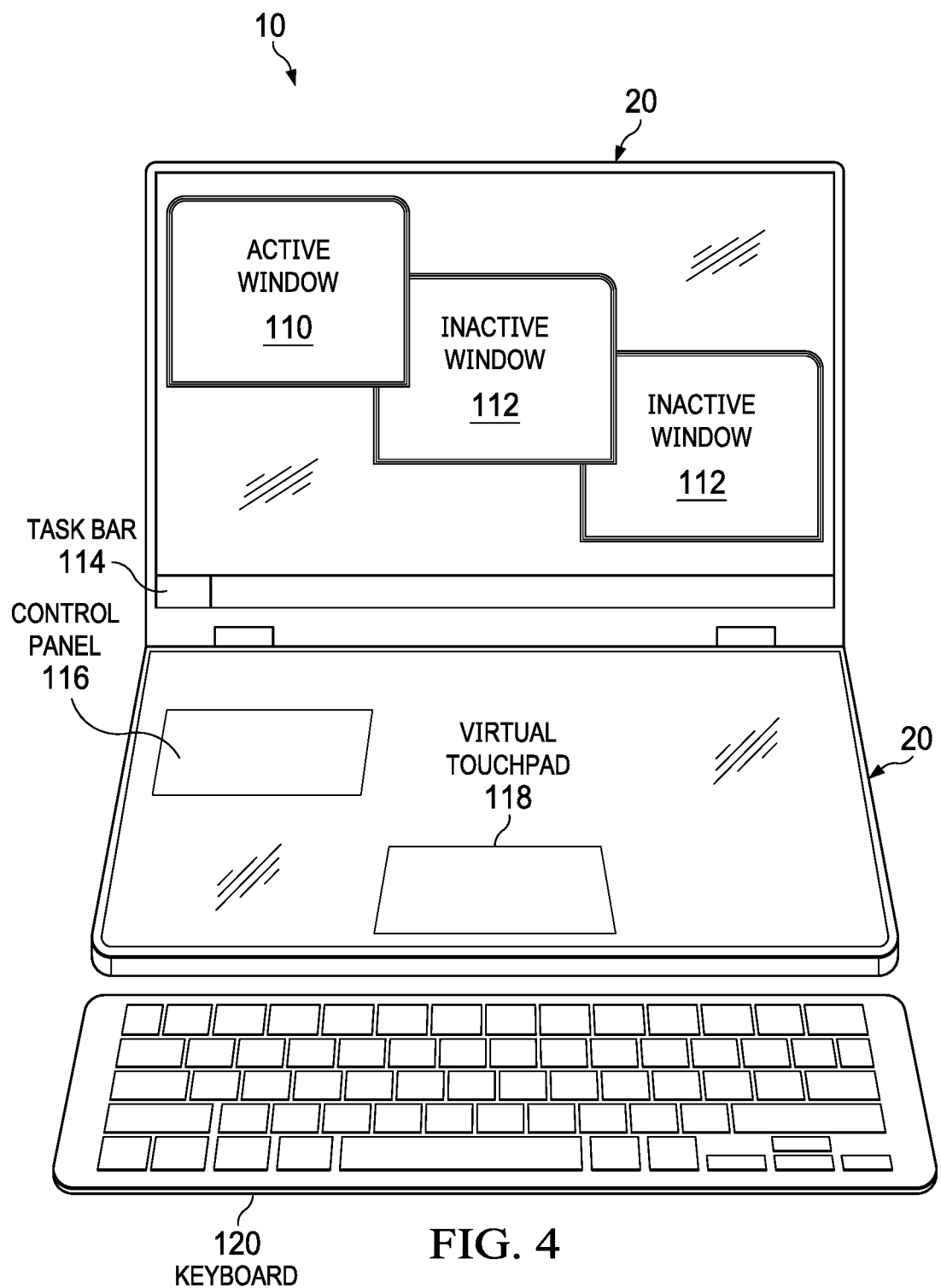
FIG. 4 depicts a front view of an information handling system having content selectively managed with native touch inputs and touch gestures based upon context.

Referring now to FIG. 4, a front view of an information handling system depicts content selectively managed with native touch inputs and touch gestures based upon context. In the example embodiment, information handling system 10 has a portable configuration with a touchscreen display 20 integrated in each rotationally coupled housing portion. An active window 110 is held in focus by the operating system to accept inputs by an end user, such as keyed inputs from a keyboard 120 that interfaces with wireless signals.

Inactive windows 112 include content of applications that are not in focus, such as applications executing in background. In some instances, an application may support multiple windows that remain in focus, such as presentation application that presents a control panel 116 to control content presentation in an active window 110. In other instances, the operating system may present content in windows that act as input devices, such as a virtual touchpad 118 or a virtual keyboard. As describe above, window manipulations are supported by the user interface manager with touch gesture inputs independent of the location of the display content that is to be manipulated. As an example, a two finger touch and slide at any location of either touchscreen display 20 will result in repositioning of virtual touchpad 118. A four finger touch and slide at the base touchscreen display will cycle through the windows presented at the lid touchscreen display 20 to select the active window in sequence. In one example embodiment, flicking an inactive window 112 with a rapid swipe commands the inactive window to the bottom display or from one display (or display region in a single multi-segmented display) to another display (or display region in a single multi-segmented display). Adding and changing configurations of the touch gestures may be supported with end user configuration to define desired features or may be added through an API by other applications to leverage the touch gesture capability. Further, the touch gestures may adapt as additional displays are interfaced with the information handling system so that touch gestures apply across content of all the displays. Advantageously, an end user is able to directly manipulate and control applications without the use of a keyboard or mouse, which is particularly helpful where a peripheral display lacks a touch detection sensor.

Figure 5:
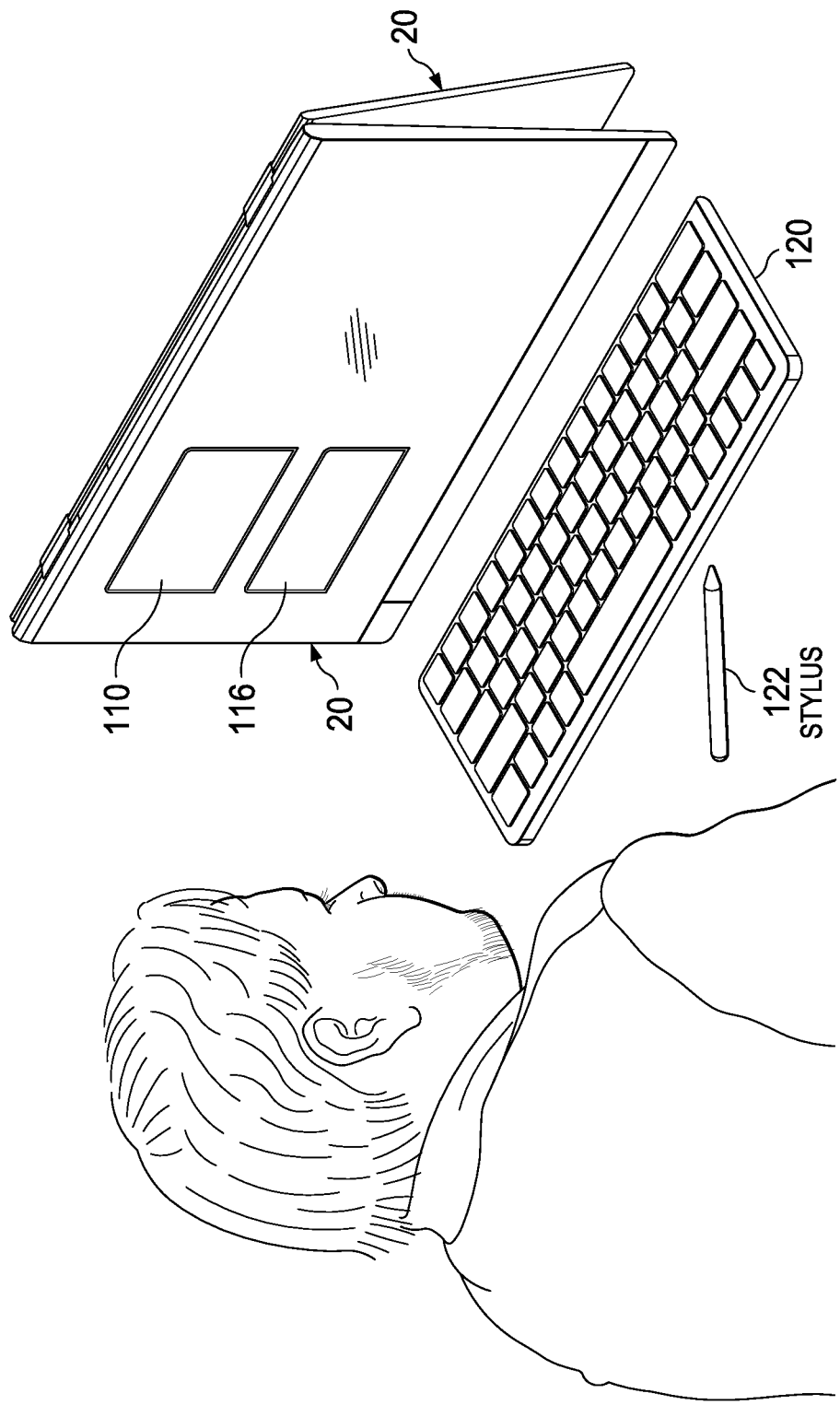
FIG. 5 depicts an example embodiment of an information handling system in a tent configuration to present content with native touch inputs and touch gestures.

Referring now to FIG. 5, an example embodiment depicts an information handling system in a tent configuration to present content with native touch inputs and touch gestures. In the example embodiment, orientation detection at the information handling system enhances touch gesture interfaces by providing an additional context for determining which touch gestures to apply and how to apply them. In the example embodiment, the housing rotates approximately 270 degrees to a tent configuration so that a touchscreen display is exposed on opposing sides of the system. Upon detection of the tent posture, a presentation application automatically adapts to provide content in a presentation mode opposite the end user while an active window 110 shows presentation content managed by a control panel 116. For example presentation content is shown across the entire opposing touchscreen display 20 inverted relative to the end user's display so that the content appears upright to an observer opposite the end user. The end user may interact with the control panel through touches, through keyboard 120 and with a stylus 122. In the presentation mode, an end user may interact with touch gestures as described above to open a palette of options, change the page content and write inputs. For instance, an application specific touch gesture, such as two finger swipe may cycle between the example view with control panel 116 presented and a writing pad that shows writing inputs made by stylus 122. In alternative embodiments, other applications may also use the presentation mode as described, such as video conferencing applications.

In various embodiments, orientation of the information handling system may be used for alternative applications, such as reading applications. For example, a dual display information handling system that presents a reading application at one housing portion in a first orientation and then automatically converts to a dual display presentation when the orientation changes, such as with each housing portion display presenting a page of reading content. The effect is a super maximum command performed automatically. In both the fully maximized presentation and the single display presentation, different touch gestures may be applied to interact with the reading application, such as to flip pages or open a table of contents.

Figure 6:
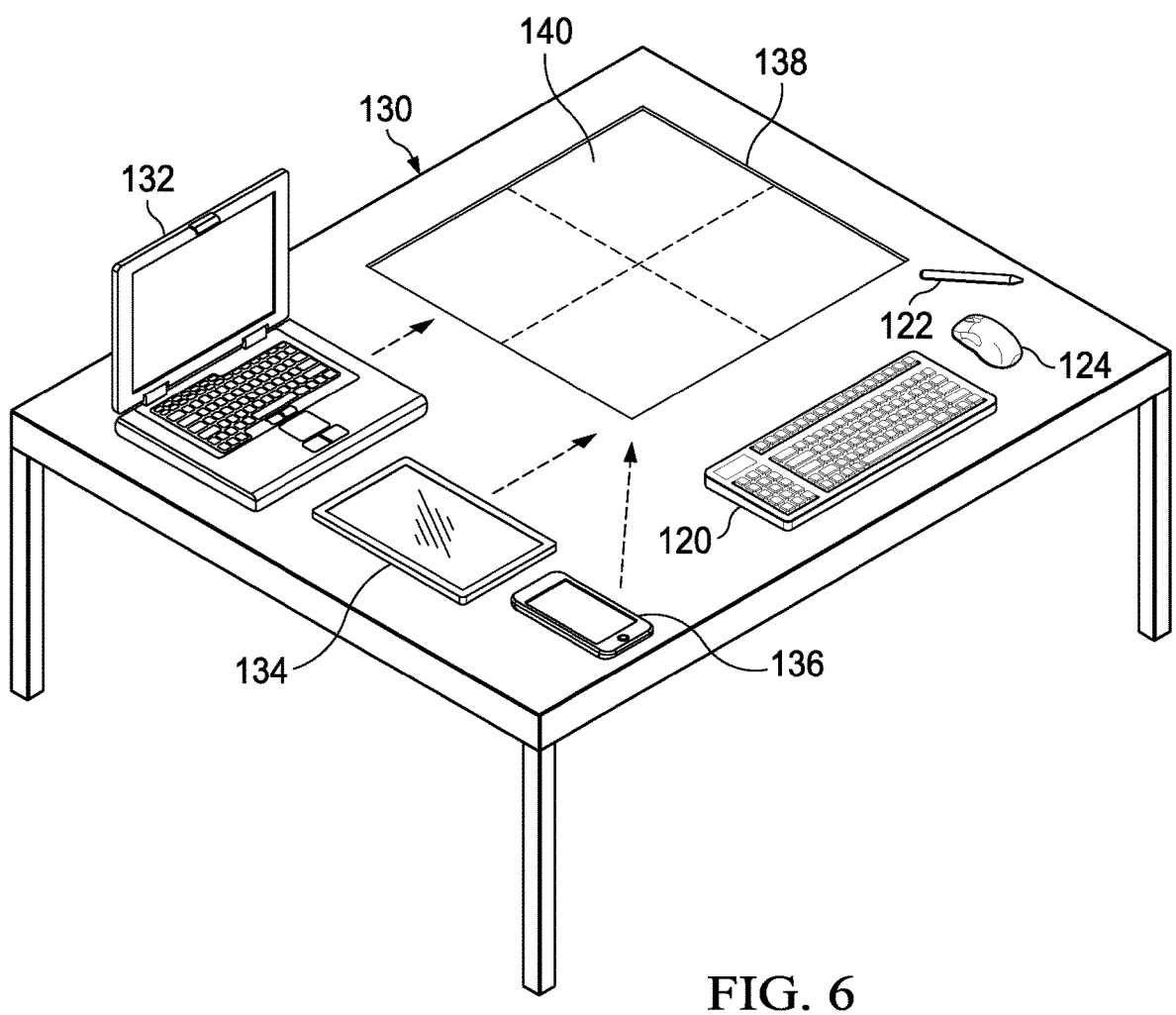
FIG. 6 depicts an example embodiment of plural information handling systems interacting with plural segments defined across an all-in-one information handling system.

Referring now to FIG. 6, an example embodiment depicts plural information handling systems interacting with plural segments defined across an all-in-one information handling system. In the example embodiment, a desktop 130 supports plural information handling systems and input devices that cooperate to process information, such as through a wireless hub or sharing application. A laptop or convertible information handling system 132 integrates a keyboard and touchpad but may or may not include a touchscreen display that accepts touches as inputs. A tablet information handling system 134 has a planar housing that integrates a touchscreen display at an upper surface to accept touches as inputs. A phone information handling system 136 is similar to tablet information handling system 134 but with a telephone size housing to provide wireless communication of voice and data. An all-in-one information handling system 138 rests on desktop 130 to present information as visual images and accept touch inputs at an integrated touchscreen display. A user interface manager as described above can execute on any one or more of the information handling systems to manage end user inputs at all of the information handling systems based upon touches to any touchscreen display or inputs made through keyboard 120, mouse 124 and stylus 122. In the example embodiment, all-in-one information handling system 138 has its display area divided between plural segments 140 that may, for instance, each present a virtual desktop. Thus, for example, end user touches in one segment 140 may control inputs and visual image presentation at other displays of the other information handling systems and/or other display segments of the all-in-one information handling system. By applying defined gestures as described above, a group of individuals sharing all-in-one information handling systems may, for instance, interact and share input devices in an intuitive and natural manner.

Although the present invention has been described in detail, it should be understood that various changes, substitutions and alterations can be made hereto without departing from the spirit and scope of the invention as defined by the appended claims.

What is claimed is:

1. An information handling system comprising:
    a housing;
    a processor disposed in the housing and operable to execute instructions that process information;
    a memory disposed in the housing and interfaced with the processor, the memory operable to store the instructions and information;
    a display integrated in the housing and interfaced with the processor, the display operable to present the information as visual images, the display integrating a touch detection sensor operable to detect touches at the display;
    a touch controller interfaced with the touch detection surface and operable to determine a position of one or more touches detected at the touch detection sensor;
    an operating system stored in the memory and having instructions that execute on the processor to support execution of plural applications by coordinating presentation of application visual images in a user interface presentation having plural windows and applying predetermined native touches as inputs to the applications; and a user interface manager interfaced with the touch controller, the user interface manager operable to determine a context, define plural logical areas of the display and distinguish predetermined touch gestures from the native touches based upon the context and the logical area of the touches, the user interface manager applying the touch gestures to adapt the user interface presentation defined by the operating system.

2. The information handling system of claim 1 wherein:
a first context comprises first and second displays presenting the information as visual images, including at least visual images of a first application presented in a first active window at the first display at a first area;
a first touch gesture is a four finger touch, the user interface manager responding to the first touch gesture by filling the first and second displays with the first active window; and
a second touch gesture is a four finger touch, the user interface manager responding to the second touch gesture by presenting the first active window at the first area.

3. The information handling system of claim 1 wherein:
the first context comprises visual images of virtual touchpad presented at the display; and
the touch gesture comprises a two finger touch on the virtual touchpad, the user interface manager responding to the two finger touch by moving the touchpad corresponding to a sliding motion of the two fingers.

4. The information handling system of claim 1 further comprising:
an accelerometer disposed in the housing and interfaced with the user interface manager, the accelerometer detecting first and second orientations;
wherein:
a first context comprises a reading application presenting content as visual images at a first display; and
the user interface manager responds to detection of the second orientation by presenting the reading application at first and second displays having a page of content on each of the first and second displays.

5. The information handling system of claim 1 wherein:
a first context comprises first and second displays presenting the information as plural windows;
a first touch gesture is a four finger swipe in a first direction, the user interface manager responding to the first gesture by minimizing all of the plural windows; and
a second touch gesture is a four finger swipe in a second direction, the user interface manager responding to the second gesture by restoring all of the plural windows from the minimizing.

6. The information handling system of claim 1 wherein:
a first context comprises first and second displays presenting the information as plural windows, one of the plural windows having an active state; and
the touch gesture comprises a four finger swipe, the user interface manager responding to the four finger swipe by cycling the previous/next virtual desktop to the active state based upon the swipe direction.

7. The information handling system of claim 1 wherein:
the context comprises first and second displays disposed in first and second rotationally coupled housing portions, the first display presenting content of a first application in an editing mode; and
the user interface manager automatically converts the first application from the editing mode to a presentation mode upon detection of the housing portions rotated to a tent orientation.

8. The information handling system of claim 7 wherein the presentation mode comprises:
a control panel at the first display presented at a first orientation; and
a presentation panel at the second display presented in an inverted orientation relative to the control panel.

9. The information handling system of claim 1 wherein the context includes at least a number of plural displays interfaced with the processor, a resolution of each of the plural displays, and the number of the plural displays that integrate in the housing and that interface as peripheral displays.

10. A method for managing a user interface presented at an information handling system display, the method comprising:
detecting a context at the information handling system;
defining plural touch gestures associated with the context;
detecting touches at a touch sensor integrated in a display of the information handling system;
distinguishing the touches between native touches associated with an operating system of the information handling system and the plural touch gestures;
applying the native touches as inputs by the operating system; and
applying the touch gestures with a user interface manager to have input values based upon the context.

11. The method of claim 10 further comprising:
detecting a context of first and second displays presenting the information as visual images, including at least visual images of a first application presented in a first active window at the first display at a first area;
detecting a first touch gesture of a four finger touch;
responding to the first touch gesture by filling the first and second displays with the first active window;
detecting a second touch gesture of a four finger touch; and
responding to the second touch gesture by presenting the first active window at the first area.

12. The method of claim 10 further comprising:
detecting a context of visual images of virtual input device presented at the display; and
detecting a first touch gesture of a two finger touch on the virtual input device;
responding to the two finger touch by moving the virtual input device with a sliding of the two finger touch; and
responding to removal of the two finger touch by locking the virtual input device in place.

13. The method of claim 10 further comprising:
detecting a first context of a reading application presenting content as visual images at a first display;
detecting a change in orientation of the display; and
in response to detection of the change in orientation, presenting the reading application at first and second displays having a page of content on each of the first and second displays.

14. The method of claim 10 further comprising:
detecting a first context of first and second displays presenting the information as plural windows;
detecting a first touch gesture of a four finger swipe in a first direction;

responding to the first gesture by minimizing all of the plural windows;

detecting a second touch gesture of a four finger swipe in a second direction; and responding to the second gesture by restoring all of the plural windows from the minimizing.

15. The method of claim 10 further comprising:

detecting a first context of first and second displays presenting the information as virtual desktops, one of the virtual desktops having an active state;

detecting the touch gesture of a four finger swipe; and responding to the four finger swipe by cycling the plural virtual desktops to the active state.

16. The method of claim 10 further comprising:

detecting a first context of first and second displays disposed in first and second rotationally coupled housing portions, the first display presenting content of a first application in an editing mode;

detecting rotation of the housing portions to a tent mode; and responding to the tent mode by automatically converting the first application from the editing mode to a presentation mode.

17. The method of claim 10 wherein the presentation mode comprises:

a control panel at the first display presented at a first orientation; and a presentation panel at the second display presented in an inverted orientation relative to the control panel.

18. A method for managing touch inputs at an information handling system having an integrated touchscreen display, the method comprising:

determining a context at the information handling system including at least a number of displays interfaced with the information handling system;

managing touch inputs as operating system native inputs if only one integrated touchscreen display interfaces with the information handling system;

managing single finger inputs as operating system native inputs when plural displays interface with the information handling system; and managing plural finger inputs as touch gestures when plural displays interface with the information handling system, the touch gestures applied as inputs by an application separate from the operating system.

19. The method of claim 18 wherein:

the touch gesture comprises plural fingers swiped in unison in a first or second direction;

the first direction commands minimizing all windows on all of the plural displays; and the second direction commands restoring all windows on all of the plural displays.

20. The method of claim 18 wherein:

the touch gesture comprises plural fingers swiped in unison in a first direction; and the first direction commands cycling an active window between plural open windows presented on the plural displays.

* * * * *